(12) United States Patent
Torchalski

(10) Patent No.: US 7,504,950 B2
(45) Date of Patent: Mar. 17, 2009

(54) SYSTEM AND METHOD FOR CONTINUOUS RFID ENCODING

(75) Inventor: Karl Torchalski, Arlington Heights, IL (US)

(73) Assignee: ZIH Corp., Hamilton (BM)

( * ) Notice: Subject to any disclaimer, the term of this patent is extended or adjusted under 35 U.S.C. 154(b) by 287 days.

(21) Appl. No.: 11/290,983

(22) Filed: Nov. 30, 2005

(65) Prior Publication Data
US 2007/0120670 A1 May 31, 2007

(51) Int. Cl.
G08B 13/14 (2006.01)
(52) U.S. Cl. .................... 340/572.4; 340/572.7
(58) Field of Classification Search ............ 340/572.1, 340/572.4, 572.7, 686.1, 539.13, 539.21, 340/539.23, 539.3, 10; 235/375, 432; 358/1.15; 400/88
See application file for complete search history.

(56) References Cited

U.S. PATENT DOCUMENTS

| | | | |
|---|---|---|---|
| 4,862,160 A | 8/1989 | Ekchian et al. | |
| 4,900,386 A | 2/1990 | Richter-Jörgensen | |
| 5,671,146 A | 9/1997 | Windel et al. | |
| 5,838,253 A | 11/1998 | Wurz et al. | |
| 6,246,326 B1 | 6/2001 | Wiklof et al. | |
| 6,409,401 B1 * | 6/2002 | Petteruti et al. | 400/88 |
| 6,509,836 B1 | 1/2003 | Ingram | |
| 7,190,270 B2 * | 3/2007 | Brown et al. | 340/572.1 |
| 7,333,017 B2 * | 2/2008 | Mori et al. | 340/572.1 |
| 2006/0077039 A1 * | 4/2006 | Ibi et al. | 340/10.1 |
| 2006/0104689 A1 * | 5/2006 | Marowski et al. | 400/76 |
| 2006/0186999 A1 * | 8/2006 | McLaughlin | 340/10.51 |
| 2006/0221363 A1 * | 10/2006 | Roth et al | 358/1.6 |
| 2006/0232411 A1 * | 10/2006 | Torchalski et al. | 340/572.1 |
| 2007/0013485 A1 * | 1/2007 | Edwards et al. | 340/10.5 |

* cited by examiner

Primary Examiner—Van T. Trieu
(74) Attorney, Agent, or Firm—Alston & Bird LLP

(57) ABSTRACT

An encoder device for encoding a series of radio frequency identification tags supported by media includes a media path, at least two antennae, at least one transceiver, and a controller. Media and radio frequency identification tags are advanced along the media path. The at least two antennae are spaced from each other and each of the antennae are positioned along the media path adjacent to at least one of the radio frequency identification tags. The at least one transceiver is configured to communicate with the antennae. The controller is configured to communicate individually with each of the respective radio frequency identification tags positioned adjacent the antennae using the transceiver and the antennae.

40 Claims, 8 Drawing Sheets

SYSTEM AND METHOD FOR CONTINUOUS RFID ENCODING

BACKGROUND OF THE INVENTION

1. Field of the Invention

The present invention relates to dispensing of printer media with radio frequency identification (RFID) tags and, more particularly, to printing on printer media with the RFID tags in combination with writing to, and reading from, the RFID tags.

2. Description of Related Art

UHF radio frequency identification (RFID) technology allows wireless data acquisition and/or transmission from and/or to active (battery powered) or passive transponders using a backscatter technique. To communicate with, i.e., "read" from and or "write" commands and/or data to a transponder, the transponder is exposed to an RF electromagnetic field by the transceiver that couples with and energizes (if passive) the transponder through electromagnetic induction and transfers commands and data using a predefined "air interface" RF signaling protocol.

When multiple passive transponders are within the range of the same RF transceiver electromagnetic field they will each be energized and attempt to communicate with the transceiver, potentially causing errors in "reading" and or "writing" to a specific transponder in the reader field. Anti-collision management techniques exist to allow near simultaneous reading and writing to numerous closely grouped transponders in a common RF electromagnetic field. However, anti-collision management increases system complexity, cost and delay response. Furthermore, anti-collision management is "blind" in that it cannot recognize where a specific transponder being processed is physically located in the RF electromagnetic field, for example, which transponder is located proximate the print head of a printer-encoder.

One way to prevent errors during reading and writing to transponders without using anti-collision management is to isolate a specific transponder of interest from nearby transponders. Previously, isolation of transponders has used RF-shielded housings and/or anechoic chambers through which the transponders are individually passed for personalized exposure to the interrogating RF field. This requires that the individual transponders have cumbersome shielding or a significant spatial separation.

RFID printers-encoders have been developed which are capable of on-demand printing on labels, tickets, tags, cards or other media with which a transponder is attached or embedded. These printer-encoders have a transceiver for on-demand communication with the transponder on the individual media to read and/or store data into the attached transponder. For the reasons given, it is highly desirable in many applications to present the media on rolls or other format in which the transponders are closely spaced. However, close spacing of the transponders exacerbates the task of serially communicating with each individual transponder without concurrently communicating with neighboring transponders on the media. This selective communication exclusively with an individual transponder is further exacerbated in printer-encoders designed to print on the media in or near the same space as the transponder is positioned when being interrogated.

When transponders are supplied attached to a carrier substrate, for example in RFID-attached labels, tickets, tags or other media supplied in bulk rolls, Z-folded stacks or other format, an extra length of the carrier substrate is required to allow one transponder on the carrier substrate to exit the isolated field area before the next transponder in line enters it. The extra carrier substrate increases materials costs and the required volume of the transponder media bulk supply for a given number of transponders. Having increased spacing between transponders may also slow overall printer-encoder throughput.

When transponders of different sizes and form factors are processed, the RF shielding and or anechoic chamber configuration will also require reconfiguration, adding cost, complexity and reducing overall productivity. In certain printer-encoders it is desired to print on transponder-mounting media in the same transponder operating region in which the transponder is being read from or written to. This may be very difficult to accomplish if the transponder also must be isolated in a shielded housing or chamber.

UHF transponders may operate in, for example, the 902-928 MHz band in the United States and other ISM bands designated in different parts of the world. For example, in FIG. 1 a conventional one-half wavelength "Forward Wave" microstrip prior art coupler 3 consisting of, for example, a rectangular conductive strip 5 upon a printed circuit board 7 having a separate ground plane 9 layer configured for these frequencies. One end of the conductive strip 5 is connected to transceiver 42 and the other end is connected through terminating resistor 8 to ground plane 9. The conductive strip 5 as shown in FIG. 1 has a significant width due to RF design requirements imposed by the need to create acceptable frequency response characteristics. This type of prior art coupler 3 has been used with UHF transponders that are relatively large compared to the extent of prior art coupler 3.

As shown by FIGS. 2a and 2b, recently developed transponders 1, designed for operation at UHF frequencies, have one dimension so significantly reduced, here for example a few millimeters wide, that they will be activated upon passage proximate the larger prior art coupler 3 by electromagnetic power leakage 10 concentrated at either side edge of the conductive strip 5 of prior art coupler 3. In FIG. 2A, the two leakage regions "A" and "B" defined by electromagnetic power leakage 10 are small and relatively far apart, increasing system logical overhead and media conveyance positioning accuracy requirements. If the transponders 1 were placed close together, then multiple transponders 1 might be activated by the physically extensive one-half wavelength "Forward Wave" microstrip prior art coupler 3.

Thus the minimum required spacing of these transponders 1 to isolate them, and thus the minimum size of media 11 (assuming that they are embedded one per label or media 11 on carrier substrate 13) must be large relative to the size of the microstrip coupler 3. This creates issues for media suppliers by limiting the available space on the media 11 for transponder 1 placement and significantly increasing the necessary accuracy of the transponder 1 placement within and or under the printable media 11 and along the liner or carrier substrate 13. This also reduces the cost advantages of using the narrow dimensioned transponder(s) 1 within media 11, as the media 11 must be much larger than the transponder 1 to achieve adequate RF isolation. Larger media typically reduces the speed at which the printer and encoder operate, thereby reducing throughput.

Competition in the market for such "integrated" printer-encoder systems as well as other RFID interrogation systems has focused attention on the ability to interrogate with high spatial selectivity any transponder from a wide range of available transponders having different sizes, shapes and coupling characteristics as well as minimization of overall system, media size, and transponder costs. In addition, this high spatial selectivity and wide range of available transponders must be balanced with the need for the integrated printer-encoder system to be able to print and encode with increased throughputs and minimal wasted intervening media.

Therefore, it would be advantageous to have a printer-encoder system that is capable of reading and encoding a large number of types of transponders, including closely spaced transponders, and printing on media supporting the transponders. Further, it would be advantageous to have a printer-encoder system that can read and encode transponders with high selectivity with increased throughput.

BRIEF SUMMARY OF THE INVENTION

The present invention addresses the above-described shortcomings by providing an encoding device, and a combination printer/encoder device that is capable of increasing throughput of media supporting transponders by providing a high degree of selectivity during encoding of the transponders. Accordingly, even closely spaced transponders may be continuously printed and/or encoded. Thus, little or no shielding is required. The encoding device may include a sensor and an encoding antennae spaced apart, or a plurality of encoding antennae providing simultaneous encoding.

An exemplary embodiment includes an encoder device. The encoder device for encoding a series of radio frequency identification tags supported by the media includes a media path, at least two antennae, at least one transceiver, and a controller. Media and radio frequency identification tags are advanced along the media path. The at least two antennae are spaced from each other and each of the antennae are positioned along the media path adjacent to at least one of the radio frequency identification tags. The at least one transceiver is configured to communicate with the antennae. The controller is configured to communicate individually with each of the respective radio frequency identification tags positioned adjacent the antennae using the transceiver and the antennae.

Another exemplary embodiment includes a method of encoding a series of radio frequency identification tags supported by media. The method includes advancing the media and radio frequency identification tags along a media path such that at least one of the radio frequency identification tags is passed proximate to at least two antennae, communicating with the radio frequency identification tags via a controller as each of the radio frequency identification tags passes proximate to the at least two antennae, determining position data of each of the radio frequency identification tags relative to each other, and encoding each of the radio frequency identification tags responsive to the position data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2b is a partial cut-away top schematic view of the prior art forward wave coupler and carrier substrate with embedded transponders of FIG. 2a;

FIG. 5b is a partial cut-away top schematic view of the coupler according to the invention and carrier substrate with embedded transponders of FIG. 5a;

DETAILED DESCRIPTION OF THE INVENTION

Figure 1:
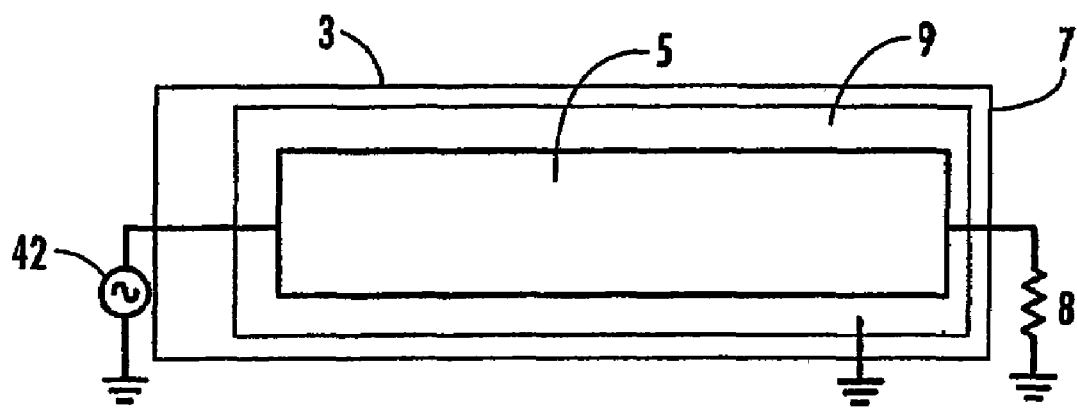
FIG. 1 is a top view of a prior art microstrip forward wave coupler.
Figure 2A:
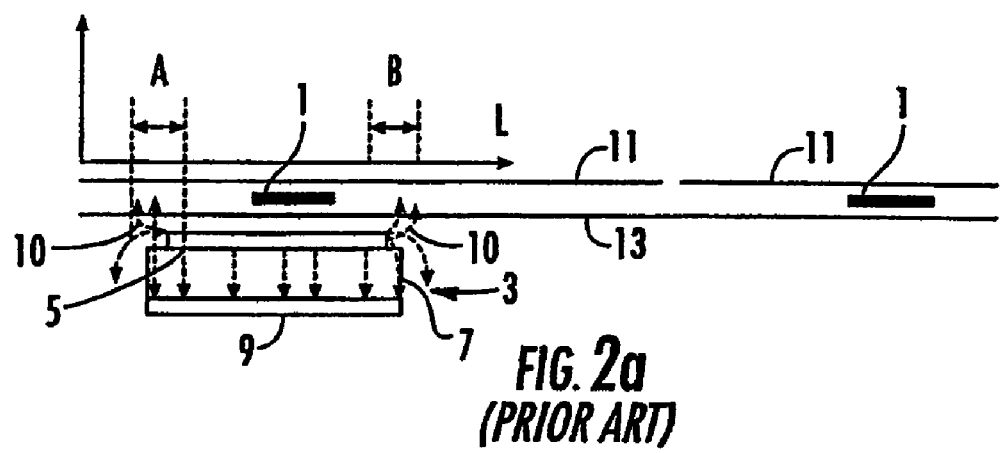
FIG. 2a is a simplified cut-away side view of a transponder-coupler structure using a prior art forward wave coupler as shown in FIG. 1, illustrating schematically locations where coupling with a narrow dimensioned transponder supplied in-line with other transponders on a carrier substrate may occur.
Figure 2B:
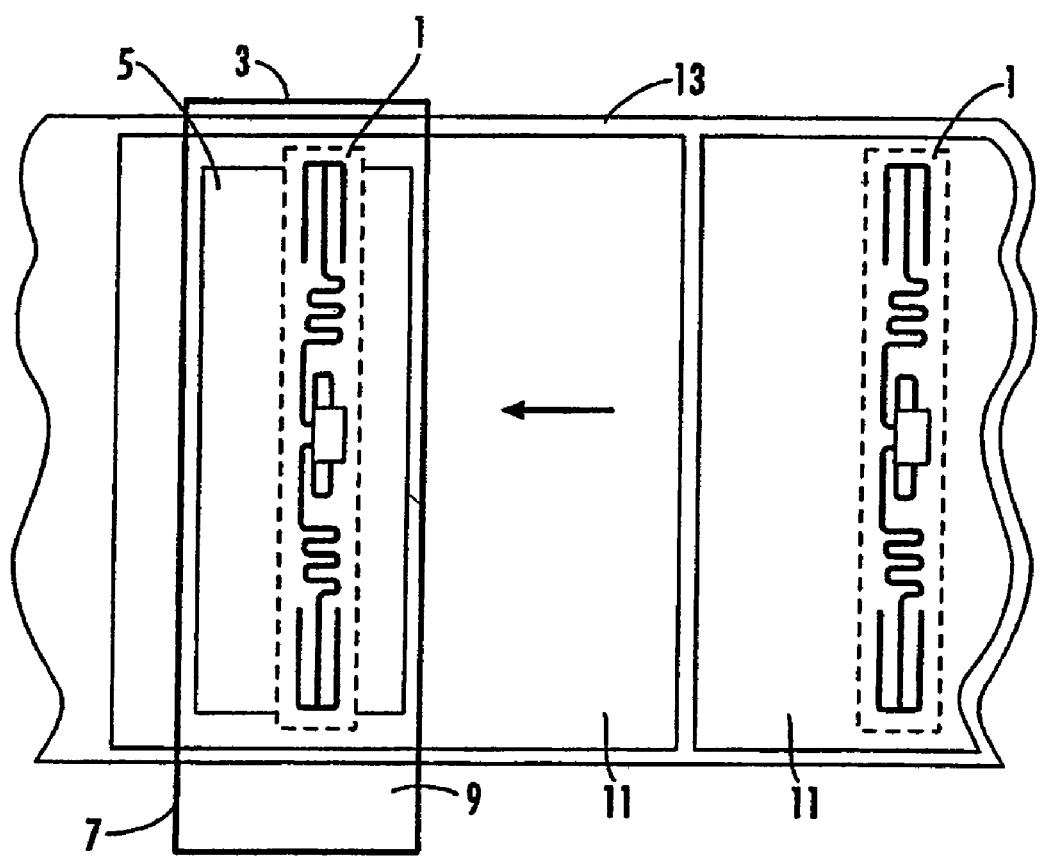

The present invention will now be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

I. Overview

The present invention includes an apparatus and method which enables an RFID transceiver (sometimes termed herein an "interrogator") to use two or more spaced antennae to increase printing and encoding throughput. Generally, this is done by either 1) simultaneously encoding several transponders 1 with several corresponding near-field antennae 30 and/or 2) using an upstream, narrow field antenna 66 to identify individual transponders and continuously printing on the media while encoding the transponders with a downstream wide field antenna 64 using the identification of the transponders.

The invention is useful in the reading and or data loading of UHF transponders, for example on an assembly line, in distribution centers or warehouses where on-demand RFID labeling is required, and in a variety of other applications. In many applications a transponder or a number of transponders are mounted or embedded on or in a label, ticket, tag, card or other media carried on a liner or carrier. It is often desirable to be able to print on the media before, after, or during communication with a transponder. Although this invention is disclosed here in a specific embodiment for use with a direct thermal or thermal transfer printer, it may also be used with any type of spatially selective RFID interrogation device or other types of printers using other printing technologies, including inkjet, dot-matrix, and electro-photographic methods.

Other frequencies of operation for the RF tag protocols herein include those in the 13.56 MHz (HF) space as well as UHF, but the present invention as described herein is not meant to be limited to any particular protocol.

II. Printing

Figure 3:
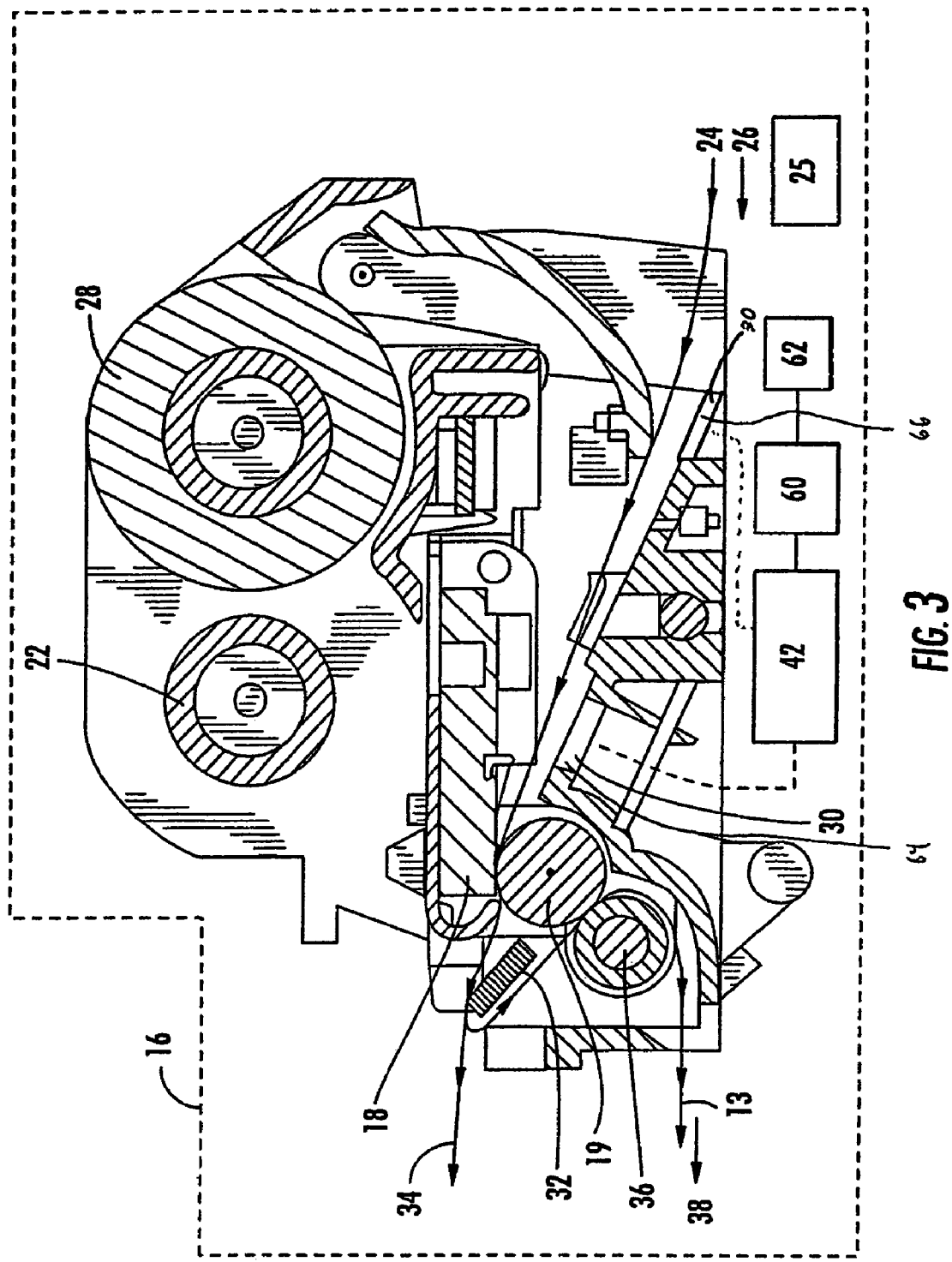
FIG. 3 is a side schematic view of a media printer according to one exemplary embodiment of the invention having an improved RFID interrogation system.

FIG. 3 is a side schematic view of a media printer 16 according to one embodiment of the invention having an improved RFID interrogation system. Operation of the media printer will now be described with reference to FIGS. 3-5. In some applications a print station may be at a distance from the RFID transceiver; in others it may be necessary to accomplish the print function in the same target space occupied by a transponder being interrogated. Media conveyance is well known in the art. Therefore a media conveyance 25 portion of the media printer 16 that drives the media with transponders 1 along the media feed path 26 is not described in detail.

As labels or other media 11 with embedded transponders 1 move along the media feed path 26 under the control of a microprocessor and through the operating region "C" of each of the near field antennae 30, data may be read from and/or written to each of the transponders. 1 having a corresponding one of the near field couplers in a manner described in more detail below. Information indicia then may be printed upon an external surface of the media 11 as the media 11 associated with each of the encoded transponders 1 passes between the platen roller 19 and the printhead 18 by selective excitation of the heating elements in the printhead 18.

When the media printer 16 is configured as a direct thermal printer, the heating elements form image dots by thermochromic color change in the heat sensitive media. When the media printer 16 is configured as a thermal transfer printer, the ink dots are formed by melting ink from the thermal transfer ribbon (not shown for clarity) delivered between printhead 18 and the media on web 24 from a ribbon supply roll 28. Patterns of printed dots thus form the desired information indicia on the media 11, such as text, bar codes or graphics.

For example, an implementation of the invention in a thermal transfer media printer 16 in which both printing and transponder communication are accomplished, but at different locations in the media printer 16, is shown in FIG. 3. The media printer 16 includes a printhead sub-assembly comprising a conventional thermal printhead 18 and platen roller 19, such as a direct thermal printer for printing on thermally-sensitive media. The web 24 of media 11, such as labels, tickets, tags or cards, is directed along a feed path 26 under the printhead 18 where on-demand printing of text, bar codes and/or graphics takes place under control of a computer or microprocessor in a controller 60. The controller 60 can be a printer controller that controls other functions of the printer 16, such as the operation of the print head 18, delivery of the web 24 of media 11, and the like. The controller 60 can operate according to predetermined instructions, such as a software program that is stored in a memory 62.

After being printed, the media 11 follows a media exit path 34 and may be peeled off the underlying carrier substrate 13 at a peeler bar 32. The liner or carrier substrate 13 for the media is guided out of the media printer 16 by a roller 36 where it exits the printer along a carrier exit path 38. When a thermal printer is configured for use as a thermal transfer printer, the ribbon supply roll 28 delivers a thermal transfer ribbon (not shown for clarity) between printhead 14 and the media on web 24. After use, the spent ribbon is collected on a take-up reel 22.

III. Individual Near Field Coupler Operation

Individual operation of each of the near field couplers 30 will now be described with reference to FIGS. 4a-5b. Notably, the term "coupler" is used herein interchangeably with the term "antenna" and neither term should be construed as excluding the other. The near field couplers 30 may be configured for use, for example, with UHF RFID transponders 1. The RFID transponders 1 may be bulk supplied on a carrier substrate 13 attached to or embedded within label, ticket, card or tag media 11.

Figure 5A:
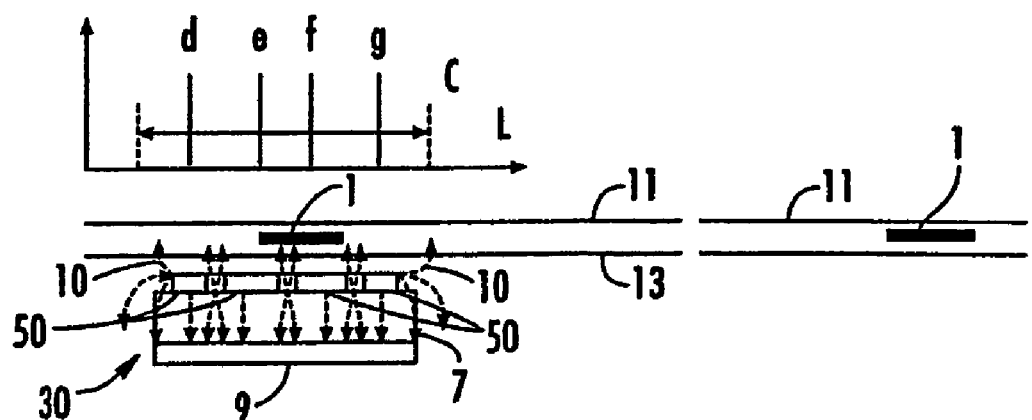
FIG. 5a is a simplified cut-away side view of a transponder-coupler structure using a coupler according to the invention, illustrating schematically the spaced apart areas where coupling with a narrow dimensioned transponder supplied in-line with other transponders on a carrier substrate may occur.

In accordance with one embodiment of the present invention, the media printer 16 includes a transceiver 42 for generating RF communication signals that are fed to a plurality (at least two) of microstrip near field couplers 30 located proximate the media feed path 26. Alternatively, each of the near field couplers 30 may be independently connected to its own transceiver 42. Each of the near field couplers 30 forms a near field pattern in the location of a transponder operating region C of each of the adjacent transponders 1, as shown in FIG. 5A. For near field couplers 30, therefore, the system may be configured to establish at predetermined transceiver power levels a mutual coupling which exclusively activates and communicates with a single transponder 1 located in the transponder operating region C.

Figure 4A:
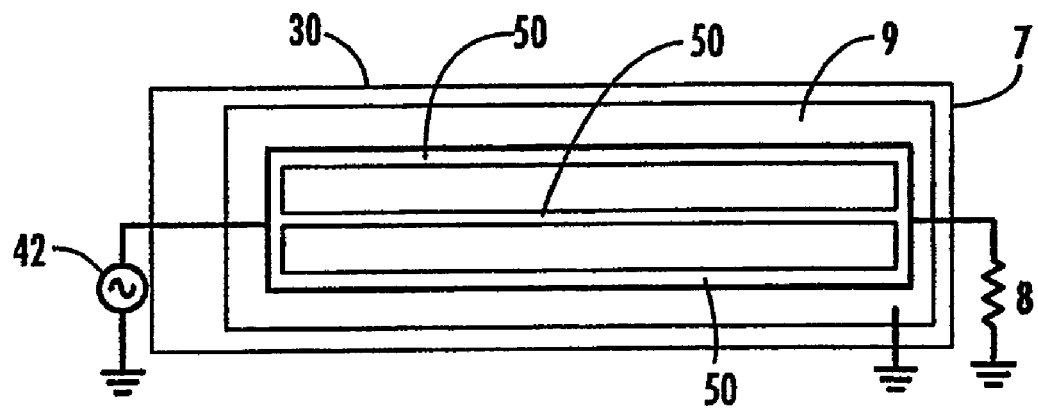
FIG. 4a is a top view of a coupler according to one exemplary embodiment of the invention.
Figure 4B:
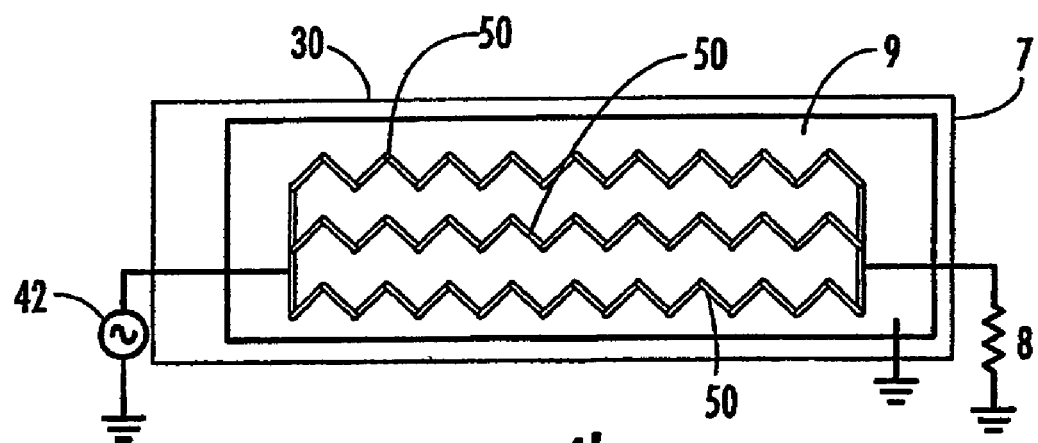
FIG. 4b is a top view of a coupler according to another exemplary embodiment of the invention.

Each of the near field couplers 30 comprises an array of lines 50, as shown for example in FIGS. 4a and 4b. Each of the near field couplers 30 may be configured as a segment of unmatched lines 50 upon a dielectric substrate, for example a printed circuit board 7, having a ground plane 9 formed on a spaced apart isolated layer, for example the reverse side of the printed circuit board 7. One end of the array of lines 50 is connected to the transceiver 42. The other end of the array of lines 50 is connected to the ground plane 9 by means of terminating resistor 8. Rather than operating as a standing wave radiating antenna, or magnetic field generating coil, the near field coupler 30 operates as a one half wavelength unmatched transmission line with, for example, a 15 ohm characteristic impedance that is terminated by a R=50 ohm terminating resistor 8.

Signals generated by the transceiver 42 passing along the transmission line generate a near field effect emanating from the transmission line edges that couples with a transponder 1 passing through the transponder operating region. Another description for the near field effect is "leaky", as discussed in "Leaky Fields on Microstrip" L. O. McMillian et al. Progress in Electromagnetics Research, PIER 17, 323-337, 1997. Because the near field effect is extremely local to the transmission line and degrades at an exponential rate with increasing distance from the transmission line, the resulting transponder operating region of a single transmission line is very narrow.

The rectangular conductive strip is therefore replaced with an array formed by a plurality of commonly fed and terminated, i.e. electrically parallel, line(s) 50, as shown for example in FIGS. 4a and 4b. The plurality of line(s) 50 therefore creates an array of leaky edges, as shown in FIG. 5a. Each leaky edge creating an electromagnetic power leakage 10 at several points within transponder operating region C. The resulting line array has similar overall width to the prior solid microstrip coupler 3 and may be similarly tuned, by adjusting the length, spacing and dielectric properties between the line(s) 50 and the ground plane 9 as well as the number of line(s) 50 and or individual line widths, shapes and inter-spacing, to adjust the overall array as an integrated single electrical structure to have the desired frequency response characteristics and generate a combined near field effect corresponding to a desired transponder operating region.

Figure 5B:
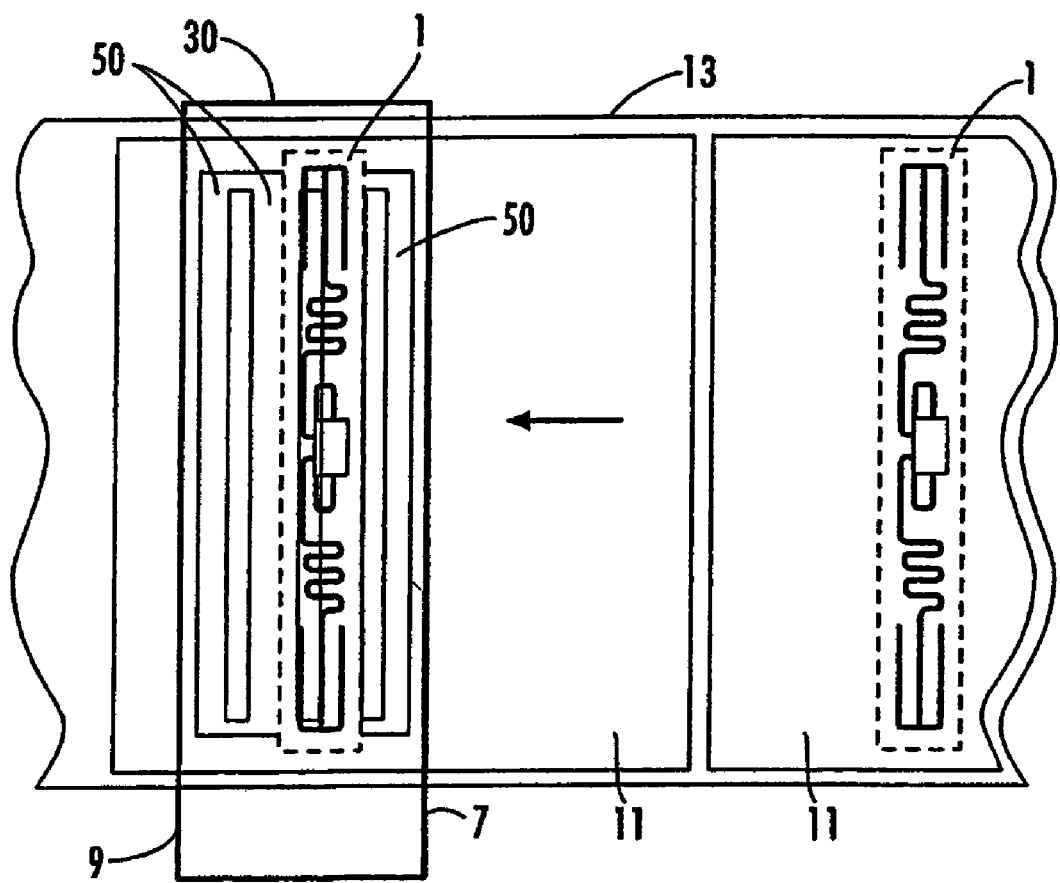

As shown by FIGS. 5a and 5b, the overall transponder operating region C resulting from a near field coupler is substantially uniform. Preferably, a distance between the near field coupler and the web 24 is selected for critical coupling. That is, the distance is selected to be that which delivers maximum power short of being so close to the web 24 that the passing transponder(s) 1 causes the effective impedance of the near field coupler 30 to unacceptably vary.

In some applications, for example the modification of an existing printer configuration to add RFID read/write capability, each of the near field couplers 30 may be placed close to the web 24 due to available space and or other design considerations such as placement of the transponder operating region C proximate the printhead 18. Where the near field couplers 30 and the web 24 are at a close proximity to one another an impedance mismatch may occur as electrical interaction with passing transponder(s) 1 varies the effective impedance of the near field couplers 30. Impedance mismatch will decrease coupling range for a given output power and with significant impedance variances may cause narrow null gaps in the operational region C, for example as illustrated by d, e, f, and g in FIG. 5a, between the individual fields emitted by each line 50.

Simplified logic added to the controller 60 may be used to move the media 11 forward a small increment, for example 1-2 millimeters if a transponder 1 in the transponder operating region C of one of the couplers 30 falls upon a null gap and transponder communications is lost. In addition, as described below, the present invention includes an embodiment in which the position of the near field couplers 30 may be mechanically adjustable to ensure correct positioning which would also overcome one of the null gaps.

The null gaps and the ability to control their presence by manipulating the location of the near field couplers 30 with respect to the web 24, are evidence of the extremely local field concentrations produced by the near field effect and the precision with which the transponder operating region C may be configured to have a wide area with sharply defined boundaries. These characteristics make the near field couplers 30 useful for reducing the required precision of transponder placement provided by media suppliers, simplifying complex transponder location and tracking logic in media supply systems, as well as reducing any requirements for shielding or increased transponder placement tolerance requirements. Further, the increased transponder operating region C allows users increased freedom to place embedded transponder(s) 1 in media 11 at desired locations, for example to avoid the printing degradation that may occur when the printhead encounters a media surface irregularity due to the presence of a RFID transponder 1.

The array of lines 50 of the near field couplers 30 may be formed by a plurality of straight line(s) 50 as shown in FIG. 4a. To further tune the near field produced by the line(s) 50, a zig-zag or wiggle may be applied to each line 50, as shown for example in FIG. 4b to further reduce the appearance and/or depth of the field strength gaps d, e, f and g. For the purpose of this specification, "zig-zag" is defined as a characteristic of a line having an overall length characteristic, but a plurality of direction changes internal to the overall length of the line. The direction changes may, for example, be sharply defined or occur as smooth curves.

Alternatively, a simplified transponder 1 read and or write system may be formed without printing capabilities by positioning the near field couplers 30 coupled to a transceiver 42 proximate the media conveyance 25 moving sequential transponders 1 through a transponder operating region C. This structure is also useful where the media 11 is unprinted, or printed upon at another location.

The near field couplers 30 are not limited to a dual plane structure. For example, the near field couplers 30 may be co-planar, i.e. the ground plane and the array of lines 50 may be located, electrically isolated from each other, in the same plane of a printed circuit board but on different traces. Also, the lines 50 need not be co-planar, but may form a 3-dimensional structure. For example, the lines 50 may be on multiple layers of a printed circuit board or formed as a wire frame of lines 50 without use of printed circuit board technology.

Obviously, at some exaggerated transceiver power level, certain transponders 1 outside the transponder operating region C may be excited. However, by this invention, at appropriate power levels in the range of normal transponder read and write power levels the mutual coupling created will be highly selective for the transponder 1 in the transponder operating region C. By mapping and then applying only the required power levels for a range of both different transponder 1 types and positions within the transponder operating region C, energy consumption and potential RF interference generation may be minimized.

The spatially-selective near field property and the lack of any other shielding requirements of the near field couplers 30 allows the economical addition of a compact, spatially-selective transponder communication module in devices such as printer-encoders. Although shielding is generally not required, it should be noted that shielding may still be employed.

Because each of the near field couplers 30 may be configured to be selective exclusively for a single transponder located in its transponder operating region C, it is possible to use a web 24 of media having transponders which are closely spaced on the web 24, as shown for example in the figures of this specification.

IV. Sensor and Encoder Antenna System

As noted above, the media printer 16 (or encoder printer) may use a plurality of couplers or antennae 30 to facilitate a higher encoding, or printing and encoding, throughput. In one embodiment of the present invention, the antennae 30 may include the narrow field antenna 66 (or sensor antenna) positioned in an upstream position along the media feed path 26 and the wide field antenna 64 (or encoding antenna) positioned downstream along the media feed path 26, nearer to the print head 18, as shown in FIG. 3.

In such a configuration, the narrow field antenna 66 may act as a sensing antenna. The sensor antenna 66 can read unique identification numbers of sequential transponders 1, or program them if the tags are blank or not unique. The spatially selective, upstream narrow field or sensor antenna 66 is configured to operate as a near-field antenna that is spatially selective. The sensor antenna 66 may be configured to act as a sensor, only reading in sequence each of the transponders 1 as they pass thereby along with the advancing media 11. In an exemplary embodiment, each reading by the sensor antenna 66 is of an identification number of the transponder within its range. The transceiver 42 is configured to receive the identification numbers and communicate them to the memory 62 for storage in an order that corresponds to the order of the transponders 1 on the media 11.

Alternatively, the narrow field antenna 66 could be configured to also write the identification number to the transponders 1 in sequence as they pass by. In this embodiment, the order of the write operations can be tracked and stored in the memory 62, or a confirmation read operation can also be performed and stored to ensure writing was successful. Regardless, the controller 60 is configured to use the identification and order information to facilitate operation of the wide field antenna 64 and the print head 18.

Figure 6:
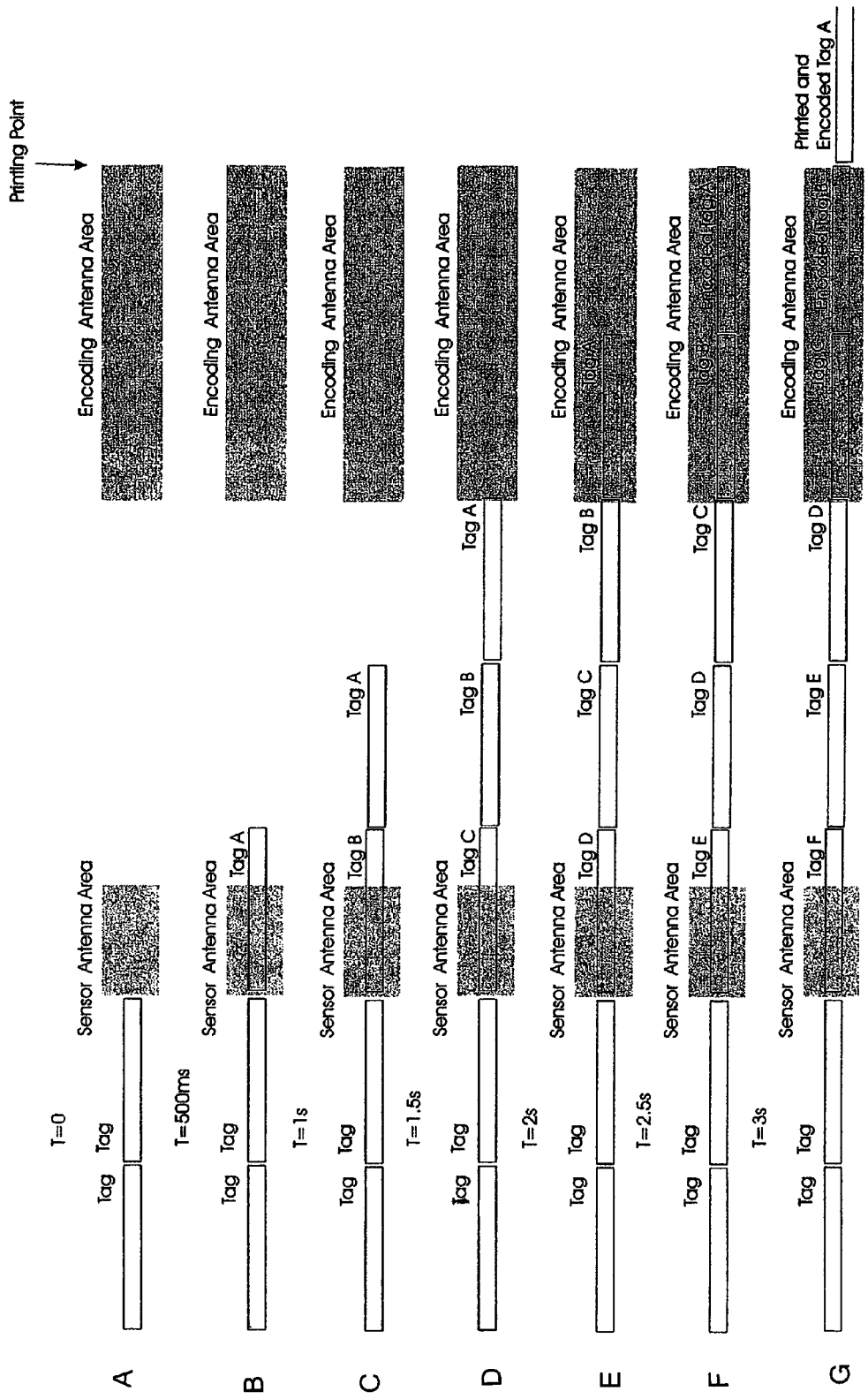
FIG. 6 is a timing diagram showing antennae sequentially interrogating RFID tags according to an exemplary embodiment of the present invention.

In an exemplary embodiment, the wide field antenna 64 is disposed near the print head 18 (or encode only machine exit) and has a generous encoding area with at least about a ½"-2" range (depending upon the size of the transponders 1), and more preferably about a 6" range. At such sizes, two or more of the closely-spaced transponders 1 are likely within the encoding range of the wide field antenna 64, as shown in FIG. 6. The wide field antenna 64 is also configured to interrogate all of the transponders 1 within its program space to determine an identification number of each of the transponders 1. Further the controller 60, via the wide field antenna 64, can be configured to selectively encode the transponders 1 based on their identification numbers and their location, which is determined by the narrow field antenna 66 upstream. Such selective communication may be achieved by "sleeping" of the non-selected transponder 1 using the controller 60. Alternatively, other protocols may offer different methods to singulate on a given tag in a population.

Despite the above described ranges, the range of the narrow field antenna 66 and the range of the encoding or wide field antenna 64 can be designed such that they are controllable and adjustable (by using a multi-element antenna, by using multiple antennae that are adjustable, as described below, by varying the power supplied, etc.) allowing embodiments of the present invention to accommodate the widest range of media and to optimize continuous throughput speeds. Such adjustment of ranges of sensor and encoding antennae can apply also to an encode only machine. Exemplary description of variations in antenna power to change the range of an antenna can be found in commonly-assigned U.S. patent application Ser. No. 11/121,208, entitled Apparatus and Method for Communicating with an RFID Transponder, filed on May 3, 2005, which is hereby incorporated herein in its entirety by reference.

Furthermore, controller logic may be employed to enable a calibration apparatus to use successful and unsuccessful attempts to communicate to RFID tags at varying powers in order to determine RFID tag location on a strip of media. Exemplary description of variations in antenna power to determine a position of an RFID tag on a media strip can be found in commonly-assigned U.S. patent application Ser. No. 10/981,967, entitled System and Method for Detecting Transponders Used With Printer Media, filed on Nov. 5, 2004, which is hereby incorporated herein in its entirety by reference. Thus, for example, the above described techniques may be employed to obtain an optimal power for both sensor and encoding antennae and determine a location of an RFID tag on a media strip. When employed on a strip of media having substantially identically located RFID tags, the above described techniques may only be necessary for several initially encountered RFID tags. However, such techniques may also enable printing and/or encoding of a strip of media having variably located RFID tags. Further characteristics of each RFID tag relevant to communication with the tag can be determined during a first read or write operation and then used to facilitate subsequent communication with the tag. For example, if the location of the tag is determined during an initial read operation by the first antenna the location information can be stored and/or communicated to be used during a subsequent write operation by the second antenna.

Operation of the narrow and wide field antennae 66 and 64 is coordinated by the controller 60 to allow continuous encoding and printing by the printer 16, as shown in FIG. 6. As the spatially-selective, narrow field antenna 66 is upstream from the wide field antenna 64, the narrow field antenna 66 encounters and reads the passing transponders 1 first. As each of the transponders 1 enters the wide field of the encoding antenna 64, it is read to obtain its identification number and indexed to its position based on the information recorded earlier by the narrow field antenna 66. This position or identification number is correlated with information to be encoded on that particular one of the transponders 1 that is obtained from the memory 62 and encoded on the transponder.

Since the order of the transponders 1 entering the program space of the wide field antenna 64 is known based on the narrow field antenna's 66 input to the controller of each transponder's unique identification number and the order of the transponders 1, the transponder that is next to be printed is known by interrogating all transponders in the program space of the wide field antenna 64 and communicating only with the tag whose identification number matches the one known to be the next to print. This may allow for continuous printing without stopping to encode a particular label.

As an example, assume the encoding antenna 64 has a range of 6 inches, the narrow field antenna 66 positioned upstream of the wider field antenna 64 has a spatially selective range of 2 inches and the media 11 includes a strip of "smart" labels 4 inches wide and 3 inches long, and each of the labels supports one of the transponders 1. Assume also that the printing speed of the printer 16 is about 6 inches per second and is continuous throughout the entire sensing and encoding process. Further, the read time for the narrow field antenna 66 is 30 ms and the encode time for the encoding antenna 64 is 500 ms.

During printing, in this example, the media 11 begins slewing at 6 inches per second and a first one of the labels passes the narrow field antenna 66 in 33 ms, completing an identification read of a first label A. A second label B passes the narrow field antenna 66 500 ms later and has its identification read. A third label C passes the narrow field antenna 66 and has its identification read.

After a time depending upon the spacing of the narrow and wide field antennae 66 and 64, the first label A enters the program area of the wide field antenna 64. No other label is in the program area so the encode process begins on the expected first label A and is completed in 500 ms. While label A enters the program area, a label D enters the area of the narrow field antenna 66 and is read or written to with identification D. As the label B enters the wide field antenna 64 program area, the label A is not yet in the printing position. Upstream, a label E enters the sensor area and is read by the narrow field antenna 66.

At this point, the wide field antenna 64 sees both labels A and B. The wider field antenna 64 begins to encode the label B and sleeps the encoded label A in an anti-collision procedure. The label A proceeds into the print position and print head 18 begins printing information associated with label A, while continuing to encode label B. The label C then enters the program area of the wider field antenna 64, a label F enters the sensor area of the narrow field antenna 66, and the process repeats itself. It should be noted that although the wider field antenna 64 is described above as sleeping the encoded label A, other methods of singulation are also possible and the present invention should not be construed as limited to singulation via sleeping. Thus, wherever the term "sleep" is used herein, such term should be construed as merely an exemplary mechanism by which singulation may be achieved.

FIG. 6 is a timing diagram showing the narrow and wide field antennae 66 and 64 sequentially interrogating RFID tags according to an exemplary embodiment of the present invention. Referring to FIG. 6, line A shows unidentified tags proceeding toward a sensing area of the narrow field antenna 66, in which the unidentified tags will be identified, for example, at a rate of one every 500 ms. Line B shows a first tag (tag A) being identified in the sensing area. Line C shows a second tag (tag B) being identified in the sensing area, while tag A proceeds toward the encoding area of the wide field antenna 64. At line D, tag A is about to enter the encoding area as a third tag (tag C) is identified at the sensing area. Line E shows tag A within the encoding area, in which tag A is encoded, while a fourth tag (tag D) is identified in the sensing area. At line F, a fifth tag (tag E) is identified while tag B is encoded in the encoding area. Tag A, having already been encoded, is in sleep mode as tag A moves toward the printing point. Line G shows a printed and encoded tag A proceeding ahead of sleeping encoded tag B, presently encoding tag C and presently identified tag F. Such process continues without interruption to provide continuous throughput of encoded and printed tags.

V. Mechanically Adjustable Antenna

Figure 7:
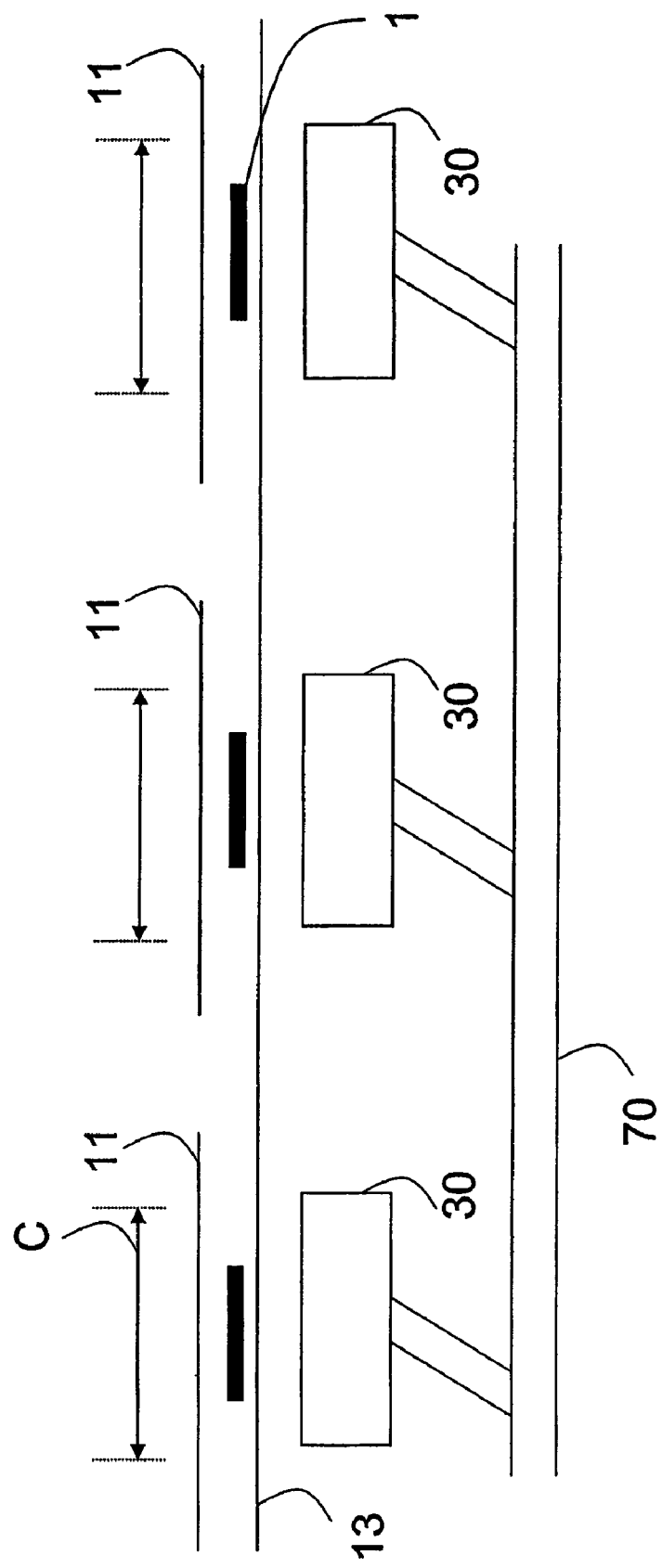
FIG. 7 is a schematic view of antennae interrogating RFID tags according to an exemplary embodiment of the present invention.

In another exemplary embodiment, the present invention includes a printer or encoder system having a plurality of near field antennae 30 that are positioned by a mechanical assembly 70, as shown in FIG. 7. The mechanical assembly 70 may include, for example, motor driven arms, linkages, hydraulics, etc. These multiple antennae 30 are multiplexed with a single radio or using multiple radios and are mechanically adjustable by the user, or by the controller 60, to correspond to a pitch of the incoming transponders 1. In this embodiment, the antennae 30 are preferably all spatially selective to allow for a wide range of pitches between the transponders 1, but have a sufficient range to allow relatively easy positioning by the assembly 70.

The controller 60 is configured to determine what to program on each of the transponders 1 positioned within range of a corresponding one of the antennae 30 (in its adjusted position) to optimize the encoding process. In addition, the controller 60 knows the order of the labels to be printed due to the sequential nature of the labels and transponders 1 on the media 11 and the sequential order of the information being sent to the controller for encoding and printing. In other words, the controller 60 is configured to determine position data responsive to receipt of the order of each of the transponders 1 and corresponding labels on the media 11, to ensure proper encoding and printing thereof. Thus, multiple transponders 1 may be encoded simultaneously by the multiple antennae 30, and printing can be continuous except for stoppage to encode several of the transponders 1 at once.

For example, one embodiment of the present invention may include three antennae 30 supported by the assembly 70, with each of the antennae 30 corresponding to one of three transceivers 42. A user may adjust the antennae 30 mechanically via the assembly 70, such that one of the antennae 30 is under each of three sequential transponders 1. Thus, when all three transponders 1 are disposed proximate to the antennae 30, each of the three transponders may be programmed simultaneously and then sequentially printed. For example, a typical programming time for RFID tags could be 500 ms, if 4"W×6"L labels are printing at 6 inches per second. In a typical printer or encoder each smart label is encoded and printed one at a time. Thus, it would take 500 ms of encode time and 1 second of print time to encode and print a single label. For three labels, total time required to encode and print would be 4.5 seconds. Meanwhile, according to this exemplary embodiment, three labels may be simultaneously encoded in 500 ms. Thus, if print time is 1 second, all three labels may be encoded and printed in 3.5 seconds.

Tags that are not able to be properly encoded (bad tags) may be handled a variety of ways and are typically identified by printing void on a label of the bad tag. The controller 60 tracks voided tags and administers programmed instructions as to whether to reprogram successive tags with the bad tag's information or to proceed without encoding or printing the bad tag's information. Other algorithms may also be utilized to optimize throughput.

Figure 8:
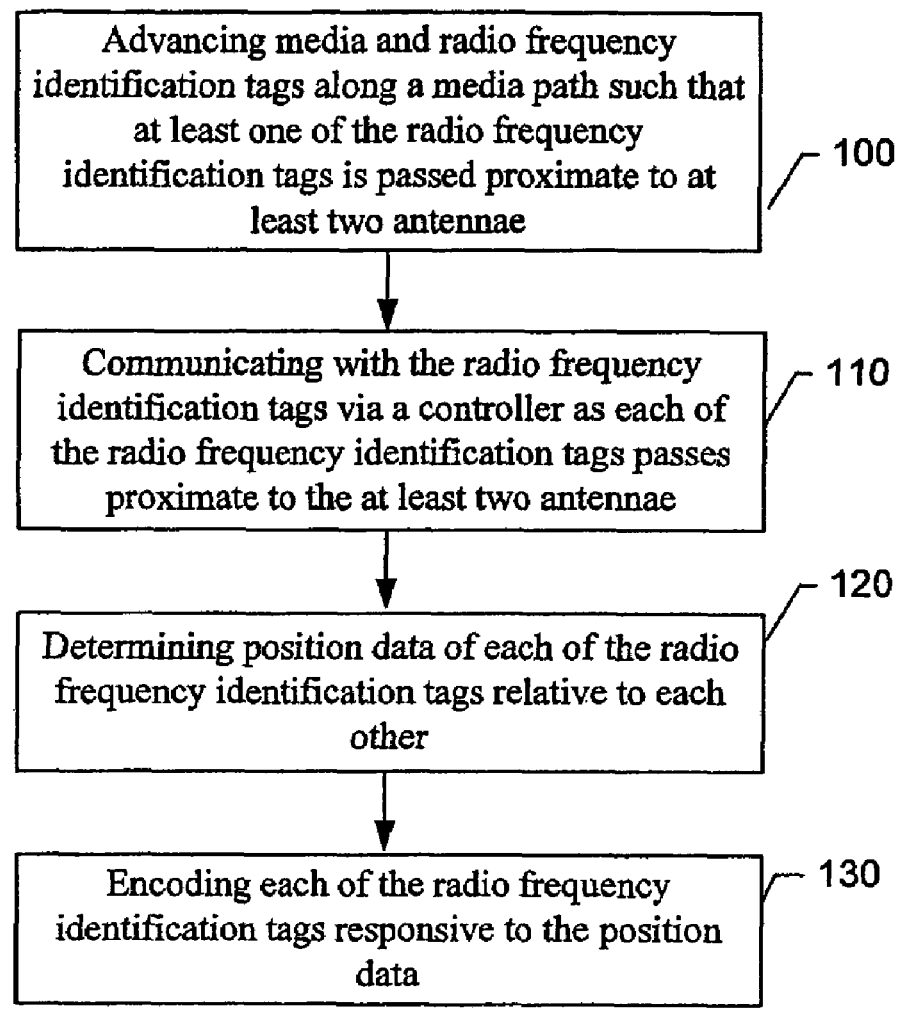
FIG. 8 is a flow chart showing a method of encoding a series of radio frequency identification tags supported by media according to an exemplary embodiment of the present invention.

FIG. 8 is a flow chart showing a method of encoding a series of radio frequency identification tags supported by media according to an exemplary embodiment of the present invention. At operation 100, media and radio frequency identification tags are advanced along a media path such that at least one of the radio frequency identification tags is passed proximate to at least two antennae. Communication with the radio frequency identification tags via a controller as each of the radio frequency identification tags passes proximate to the at least two antennae is performed at operation 110. At operation 120, position data of each of the radio frequency identification tags relative to each other is determined. Each of the radio frequency identification tags is encoded responsive to the position data at operation 130.

The present invention includes many exemplary embodiments. For example, throughput of a printer and/or encoder is improved by allowing continuous printing and/or encoding of media. Additionally, the present invention allows such continuous printing without requiring introduction and use of shielding, while allowing for accuracy in encoding tags. Furthermore, the present invention may be employed, for example, in an embodiment in which tags are encoded for combination with labels prior to testing of the tags before sale of the media.

Many modifications and other embodiments of the inventions set forth herein will come to mind to one skilled in the art to which these inventions pertain having the benefit of the teachings presented in the foregoing descriptions and the associated drawings. For example, the present invention may include an encode only machine for only encoding tags (pre-printed or not) for immediate use or feeding a standard printer that can later print data on an encoded tag. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An encoder device for encoding one or more radio frequency identification tags in a series of radio frequency identification tags supported by a strip of media, the encoder device comprising:
   a media path along which the media and radio frequency identification tags are advanced;
   at least a first antenna and a second antenna spaced from each other and each of the antennas positioned along the media path;
   at least one transceiver configured to communicate with the antennas; and
   a controller configured to communicate with each of the respective radio frequency identification tags using the transceiver and the antennas,
   wherein the first antenna being configured to communicate with a radio frequency identification tag positioned adjacent the first antenna, wherein the controller determines information about the radio frequency identification tag, and wherein the controller uses the determined information to control encoding of the particular radio frequency identification tag at the second antenna.

2. The encoder device of claim 1, wherein the antennas are near-field antennas configured to simultaneously communicate with adjacent-most ones of the radio frequency identification tags.

3. The encoder device of claim 2, further comprising a positioning assembly supporting at least one of the antennas and configured to move the at least one of the supported antennas along the media path until adjacent the adjacent-most one of the radio frequency identification tags.

4. The encoder device of claim 3, wherein the controller is configured to determine a position of the adjacent-most one of the radio frequency identification tags and communicate the position to the positioning assembly.

5. The encoder device of claim 1, wherein the controller is configured to determine a void one of the radio frequency identification tags using the transceiver and an upstream one of the antennas and to skip encoding of the void radio frequency identification tag.

6. The encoder device of claim 1, wherein the controller is configured to communicate with the radio frequency tags by encoding each of the radio frequency tags with unique data.

7. The encoder device of claim 1, wherein the controller is configured to detect a void one of the radio frequency identification tags and to repeat encoding of a next one of the radio frequency identification tags with unique data previously intended for the void radio frequency identification tag.

8. The encoder device of claim 1, wherein the first antenna is a sensor antenna and the second antenna is an encoding antenna.

9. The encoder device of claim 8, wherein the encoder device is combination printer and encoder for printing on a strip of media in addition to encoding the radio frequency identification tags supported by the media, the encoder device further comprising a print head positioned adjacent the media path and configured to print on the media as the media passes thereby.

10. The encoder device of claim 9, wherein the controller is configured to track a sequence of the radio frequency identification tags using communications therewith and is further configured to communicate printing indicia to the print head corresponding to a sequence of the radio frequency identification tags.

11. The encoder device of claim 9, wherein the sensor antenna is positioned upstream of the encoding antenna and the encoding antenna is positioned downstream and closer to the print head.

12. The encoder device of claim 11, wherein the sensor antenna is a near-field antenna and the encoding antenna has a relatively large field compared to the sensor antenna.

13. The encoder device of claim 12, wherein the sensor antenna is configured for at least one of reading and encoding an identification number of an adjacent-most one of the radio frequency identification tags.

14. The encoder device of claim 13, wherein the sensor antenna is further configured to pass the identification number to the controller and wherein the controller is configured to use the identification number to coordinate selective encoding radio frequency tags within the large field.

15. The encoder device of claim 14, wherein the sensor antenna has a field of less than approximately two inches and the encoding antenna has a field of greater than approximately six inches.

16. The encoder device of claim 14, wherein the field of the encoding antenna is configured to allow continuous encoding of the radio frequency identification tags without halting printing by the print head.

17. The encoder device of claim 1, wherein the controller is configured to vary power levels of the antennas during communication with the particular radio frequency identification tag and measure a response of the particular radio frequency identification tag to the varied power levels at various ranges.

18. The encoder device of claim 17, wherein the controller is configured to determine a position of the particular radio frequency identification tag on the media responsive to the measured response.

19. A method of encoding one or more radio frequency identification tags in a series of radio frequency identification tags supported by media, the method comprising:
advancing the media and radio frequency identification tags along a media path such that at least one of the radio frequency identification tags is passed proximate to at least a first antenna and a second antenna;
communicating with the radio frequency identification tags via a controller as each of the radio frequency identification tags passes proximate to the first and second antennas;
determining information of each of the radio frequency identification tags; and
encoding each of the radio frequency identification tags responsive to the determined information.

20. The method of claim 19, further comprising:
sensing an identification the radio frequency identification tags at an upstream one of the first and second antennas; and
encoding the radio frequency identification tags at a downstream one of the first and second antennas.

21. The method of claim 19, further comprising:
writing an identification number to the radio frequency identification tags at an upstream one of the first and second antennas; and
encoding the radio frequency identification tags at a downstream one of the first and second antennas, wherein the encoding is responsive to the identification number.

22. An encoder device for encoding one or more radio frequency identification tags in a series of radio frequency identification tags supported by a strip of media, the encoder device comprising:
a media path along which the media and radio frequency identification tags are advanced;
at least a first antenna and a second antenna spaced from each other and each of the antennas positioned along the media path;
at least one transceiver configured to communicate with the antennas; and
a controller configured to communicate with each of the respective radio frequency identification tags using the transceiver and the antennas,
wherein the first antenna being configured to communicate with a radio frequency identification tag positioned adjacent the first antenna, wherein the controller determines position data about the radio frequency identification tag, and wherein the controller uses the position data to control encoding of the particular radio frequency identification tag at the second antenna.

23. The encoder device of claim 22, wherein the first antenna is a sensor antenna configured for at least one of reading and encoding an identification number of an adjacent-most one of the radio frequency identification tags.

24. The encoder device of claim 23, wherein the second antenna is a encoding antenna and wherein the sensor antenna is further configured to pass the identification number to the controller and wherein the controller is configured to use the identification number to coordinate selective encoding radio frequency tags at the encoding antenna.

25. A method of encoding one or more radio frequency identification tags in a series of radio frequency identification tags supported by media, the method comprising:

advancing the media and radio frequency identification tags along a media path such that at least one of the radio frequency identification tags is passed proximate to at least a first antenna and a second antenna;

communicating with the radio frequency identification tags via a controller as each of the radio frequency identification tags passes proximate to the first and second antennas;

determining position data of each of the radio frequency identification tags relative to each other; and encoding each of the radio frequency identification tags responsive to the position data.

26. The method of claim 25, further comprising:

sensing an identification the radio frequency identification tags at an upstream one of the first and second antennas; and encoding the radio frequency identification tags at a downstream one of the first and second antennas.

27. The method of claim 26, wherein the determining position data is performed responsive to communication of an order of the radio frequency identification tags to a controller responsive to the sensing.

28. The method of claim 25, further comprising:

writing an identification number to the radio frequency identification tags at an upstream one of the first and second antennas; and encoding the radio frequency identification tags at a downstream one of the first and second antennas, wherein the encoding is responsive to the identification number.

29. The method of claim 25, further comprising positioning each of the first and second antennas along the media path via a positioning assembly until the first and second antennas are adjacent to corresponding ones of the radio frequency identification tags.

30. The method of claim 29, wherein the encoding comprises simultaneously encoding one of the radio frequency identification tags at each of the first and second antennas.

31. The method of claim 30, further comprising printing each of the radio frequency identification tags.

32. The method of claim 31, wherein the printing comprises sequentially printing encoded ones of the radio frequency identification tags responsive to the position data.

33. The method of claim 25, further comprising varying power levels of the antennas during communication with the particular radio frequency identification tag and measuring a response of the particular radio frequency identification tag to the varied power levels at various ranges.

34. The method of claim 33, further comprising determining a location of the particular radio frequency identification tag on the media responsive to the measured response.

35. An encoder device for encoding one or more radio frequency identification tags in a series of radio frequency identification tags supported by a strip of media, the encoder device comprising:

a media path along which the media and radio frequency identification tags are advanced;

at least a first antenna and a second antenna spaced from each other and each of the antennas positioned along the media path;

at least one transceiver configured to communicate with the antennas; and a controller configured to communicate with each of the respective radio frequency identification tags using the transceiver and the antennas, wherein the first antenna being configured to communicate with a radio frequency identification tag positioned adjacent the first antenna, wherein the controller is configured to vary at least one of a read power level or a write power level of the first and second antennas.

36. The encoder device of claim 35, wherein the first antenna is a sensor antenna configured for at least one of reading and encoding an identification number of an adjacent-most one of the radio frequency identification tags.

37. The encoder device of claim 36, wherein the second antenna is an encoding antenna and wherein the sensor antenna is further configured to pass the identification number to the controller and wherein the controller is configured to use the identification number to coordinate selective encoding radio frequency tags at the encoding antenna.

38. A method of encoding one or more radio frequency identification tags in a series of radio frequency identification tags supported by media, the method comprising:

advancing the media and radio frequency identification tags along a media path such that at least one of the radio frequency identification tags is passed proximate to at least a first antenna and a second antenna;

communicating with the radio frequency identification tags via a controller as each of the radio frequency identification tags passes proximate to the first and second antennas;

varying at least one of a read power level or a write power level of the first and second antennas;

measuring a response to the varying at least one of a read power level or a write power level of the first and second antennas; and determining a position of the particular radio frequency identification tag on the media responsive to the measured response.

39. The method of claim 38, further comprising:

sensing an identification the radio frequency identification tags at an upstream one of the first and second antennas; and encoding the radio frequency identification tags at a downstream one of the first and second antennas.

40. The method of claim 38, further comprising:

writing an identification number to the radio frequency identification tags at an upstream one of the first and second antennas; and encoding the radio frequency identification tags at a downstream one of the first and second antennas, wherein the encoding is responsive to the identification number.

* * * * *